(12) United States Patent
Fan et al.

(10) Patent No.: US 11,057,789 B2
(45) Date of Patent: Jul. 6, 2021

(54) METHODS FOR MEASUREMENT REPORTING, A USER EQUIPMENT AND NETWORK NODES

(71) Applicant: Telefonaktiebolaget LM Ericsson (publ), Stockholm (SE)

(72) Inventors: Rui Fan, Beijing (CN); Shaohua Li, Beijing (CN); Andres Reial, Malmö (SE); Claes Tidestav, Bålsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/346,750

(22) PCT Filed: Nov. 2, 2017

(86) PCT No.: PCT/CN2017/109181
§ 371 (c)(1),
(2) Date: May 1, 2019

(87) PCT Pub. No.: WO2018/082628
PCT Pub. Date: May 11, 2018

(65) Prior Publication Data
US 2020/0059807 A1    Feb. 20, 2020

(30) Foreign Application Priority Data
Nov. 4, 2016 (WO) ............... PCT/CN2016/104674

(51) Int. Cl.
*H04W 24/10* (2009.01)
*H04B 7/06* (2006.01)

(52) U.S. Cl.
CPC .......... *H04W 24/10* (2013.01); *H04B 7/0632* (2013.01); *H04B 7/0695* (2013.01)

(58) Field of Classification Search
CPC .... H04W 24/10; H04B 7/0695; H04B 7/0632
See application file for complete search history.

(56) References Cited

U.S. PATENT DOCUMENTS 7,617,315 B2 * 11/2009 Black ..................... H04L 43/00
370/338
2014/0112269 A1 4/2014 Yu et al.
(Continued)

FOREIGN PATENT DOCUMENTS

CN    104737461 A    6/2015
EP    2946586 A1    11/2015
(Continued)

OTHER PUBLICATIONS

Unknown, Author, "Beam grouping for beam management", 3GPP TSG RAN WG1 Meeting #86bis, R1-1610437, Lisbon, Portugal, Oct. 10-14, 2016, pp. 1-5.
(Continued)

*Primary Examiner* — Jamal Javaid
(74) *Attorney, Agent, or Firm* — Murphy, Bilak & Homiller, PLLC

(57) ABSTRACT

Embodiments of the present disclosure relate to methods and network nodes and user equipment for measurement reporting. In example embodiments, a method implemented in a user equipment is provided. According to the method, the user equipment detects a plurality of beams from one or more of the UE's neighboring nodes, forms one measurement result of a group based on beam grouping information, and then send measurement report to the UE's serving node, including the measurement result of the group is included in the measurement report. According to the present disclosure, more neighboring nodes can be reported by the UE in a measurement report.

13 Claims, 7 Drawing Sheets

(56) References Cited

U.S. PATENT DOCUMENTS

| | | |
|---|---|---|
| 2014/0198681 A1 | 7/2014 | Jung et al. |
| 2015/0257073 A1 | 9/2015 | Park et al. |
| 2016/0099763 A1* | 4/2016 | Chen ................. H04B 7/063 370/329 |
| 2016/0150435 A1* | 5/2016 | Baek ................. H04B 7/0608 370/252 |
| 2017/0033854 A1* | 2/2017 | Yoo ................... H04W 24/00 |

FOREIGN PATENT DOCUMENTS

| | | |
|---|---|---|
| RU | 2538735 C2 | 1/2015 |
| WO | 2014112789 A1 | 7/2014 |
| WO | 2015156575 A1 | 10/2015 |

OTHER PUBLICATIONS

Unknown, Author, "Evaluation of beam-based RRM measurement", 3GPP TSG-RAN WG2 Meeting #95bis, R2-167157, Kaohsiung, Taiwan, Oct. 10-14, 2016, pp. 1-6.

Unknown, Author, "On procedures for beam selection and feedback signaling", 3GPP TSG-RAN WG1 #86-BIS, R1-1610243, Lisbon, Portugal, Oct. 10-14, 2016, pp. 1-5.

* cited by examiner

```
┌─────────────┐         ┌─────────────┐
│   BEGIN     │         │   BEGIN     │
└──────┬──────┘         └──────┬──────┘
       │                       │
┌──────┴──────┐ ┌─────────┐   │
│    3410     │ │  3411   │   ┌──────┴──────┐
│Host computer│◄┤Host comp│   │    3510     │
│provides user├─►│executes │   │Host computer│
│    data     │ │  host   │   │provides user│
│             │ │applicat.│   │    data     │
└──────┬──────┘ └─────────┘   └──────┬──────┘
       │                              │
┌──────┴──────┐                ┌──────┴──────┐
│    3420     │                │    3520     │
│Host computer│                │Host computer│
│  initiates  │                │  initiates  │
│transmission │                │transmission │
│carrying the │                │carrying the │
│ user data to│                │ user data to│
│   the UE    │                │   the UE    │
└──────┬──────┘                └──────┬──────┘
       │                              │
┌ ─ ─ ─┴ ─ ─ ─┐                ┌ ─ ─ ─┴ ─ ─ ─┐
│    3430     │                │    3530     │
│Base station │                │ UE receives │
│transmits the│                │the user data│
│  user data  │                │             │
└ ─ ─ ─┬ ─ ─ ─┘                └ ─ ─ ─┬ ─ ─ ─┘
       │                              │
┌ ─ ─ ─┴ ─ ─ ─┐                ┌──────┴──────┐
│    3440     │                │    END      │
│UE executes  │                └─────────────┘
│   client    │
│ application │
└ ─ ─ ─┬ ─ ─ ─┘
       │
┌──────┴──────┐
│    END      │
└─────────────┘

Figure 11                     Figure 12
```

METHODS FOR MEASUREMENT REPORTING, A USER EQUIPMENT AND NETWORK NODES

TECHNICAL FIELD

The exemplary embodiments of the present disclosure relate generally to wireless communication field and, more specifically, relate to methods, user equipment and network nodes for measurement reporting.

BACKGROUND

This section is intended to provide a background or context to the present disclosure that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

In the upcoming generation, communication at high frequency is under discussion. Due to severe path loss issues in the scenario of high frequency, high gain beamforming is needed to provide good coverage and high bitrate. Each beam is identified by a beam identifier and a user equipment, UE, can measure quality for individual beam. Beams from the UE's serving node can be acknowledged by the UE. However, beams from neighboring node can't be specifically acknowledged by the UE. In other words, except the beams from its serving node, UE does not know which beam is from which neighboring node.

On the other hand, there is a need that UE measuring the quality of its neighboring nodes by measuring the quality of the beams from the neighboring nodes, and then report the measuring results to its serving node. The serving node would then decide whether a handover is needed for the UE according to the measurement report. As UE does not know beam relationship to its neighboring nodes, it is proposed that UE reports the quality for each individual beam. According to the proposal, a maximum number of reported beams is limited. In order to timely notify quality of the neighboring nodes to the serving node, the reporting is triggered once anyone beam from any neighboring node has better quality than the beams from the serving node.

There is some problem with this proposal. Take scenario in FIG. 6 as an example, inventors found that, some neighboring node that could be a good handover candidate may not be included in UE measurement report due to the limited number of reported beams. Further, it could be even worse when some of the reported beams with best quality are from a same node. In FIG. 6, cell 0 with beam 1 and beam 2 belongs to the serving node of the UE. Beams from neighboring node 1 (shown as cell 1) are with index 3, 4 and beams from neighboring node 2 (cell 2) are with index 5, 6. Beam 1~6 are detected by the UE. Assuming the maximum reported number of beams from neighboring nodes is 2, if beam quality, for example, reference signal received power, RSRP, of beam 3, 4 are better than that of beam 5, 6, then UE will only report beam quality corresponding to neighboring node 1. Other examples for characters of beam quality include one or more of: Reference Signal Received quality, RSRQ, and Signal to Interference plus Noise Ratio, SINR, etc. When neighboring node 1 is overloaded and quality of the serving node become worse, the serving node will not have a candidate for UE to handover.

In view of the above, how to provide quality of more neighboring nodes in measurement report should be taken into account.

SUMMARY

It is an object of the present disclosure to at least address the problems outlined above, and to provide methods, wireless network nodes and the terminal devices as follows.

According to a first aspect of the present disclosure, there is provided a method implemented by a UE, for measurement, the method comprises:

detecting, a plurality of beams from one or more of the UE's neighboring nodes;

forming, one measurement result of a group based on beam grouping information;

sending, measurement report to the UE's serving node, wherein the measurement result of the group is included in the measurement report.

A further embodiment provides a method, wherein the forming one measurement result of a group based on beam grouping information comprises:

obtaining, a plurality of measurement results corresponding to each of the plurality of beams;

sorting, all measurement results of the beams which belong to the group, wherein the beam grouping information indicates mapping relation between beam and group;

determining, one measurement result of the group, based on all the measurement results of the beams which belong to the group.

In some embodiments, the determining one measurement result of the group comprises:

obtaining, an average value of the all measurement results of the beams which belong to the group; or obtaining, the highest value of the all measurement results of the beams which belong to the group.

In some embodiment, the method further comprises:

obtaining the beam grouping information from the serving node, through a dedicated signaling; or obtaining the beam grouping information from the one or more of the UE's neighboring nodes, on one or more broadcasting channels.

In some embodiment, the beam grouping information comprises any of: frequency location range, time occasion range, or beam ID range, which enables the UE to sort the beams within any of the range into one group.

In some alternative embodiments, the beam grouping information comprises a mapping relation between a group and deterministic beams.

In a further embodiment, before the forming of one measurement result of the group, the method further comprises:

receiving, a preference of measurement report from the serving node;

determining, based on the preference, that measurement reporting is per group based.

A second aspect of the present disclosure provides a method implemented by a network node, for obtaining measurement report, wherein the network node is a serving node of a user equipment, UE. The method comprises:

obtaining, from one or more of neighboring nodes, beam grouping information of the one or more of neighboring nodes;

informing, the beam grouping information of the one or more of neighboring nodes to the UE;

receiving, a measurement report from the UE, wherein the measurement report comprising at least one measurement result of a group corresponding to the beam grouping information.

In a further embodiment, before informing the beam grouping information of the one or more of neighboring nodes, the method may further comprise:

informing, its preference of measurement report, to the UE; wherein the preference instruct that measurement reporting is per group based.

A third aspect of the present disclosure provides a method implemented by another network node, for obtaining measurement report. The network node is a neighboring node of a serving node for a user equipment, UE, and the method comprises:

broadcasting, its beam grouping information, over a broadcast channel;

wherein the beam grouping information indicates mapping relationship between beams from the network node and a group, which enables the UE to recognize a beam belonging to the group.

In a further embodiment, the method further comprises:

notifying, the relationship of the group with the network node itself.

In a fourth aspect, the present disclosure also provides an apparatus at a user equipment. The apparatus comprises:

a processor; and a memory coupled to the processing unit and storing instructions thereon, the instructions, when executed by the processing unit, causing the apparatus to implement any one of the above UE method embodiments.

In a fifth aspect, the present disclosure also provides an apparatus at a network node. The apparatus comprises:

a processor; and a memory coupled to the processing unit and storing instructions thereon, the instructions, when executed by the processing unit, causing the apparatus to implement any one of the above network method embodiments.

In a sixth aspect of the present disclosure, a communication system is provided. The communication system includes a host computer. The communication system comprises processing circuitry configured to provide user data; and a communication interface is configured to forward the user data to a cellular network for transmission to a user equipment (UE); wherein the cellular network comprises a base station having a radio interface and processing circuitry, and the base station's processing circuitry is configured to carry out a method according to the second or third aspect of the present disclosure.

A seventh aspect of the present disclosure provides a method implemented in a communication system including a host computer, a base station and a UE. The method comprises: at the host computer, providing user data; and at the host computer, initiating a transmission carrying the user data to the UE via a cellular network comprising the base station, wherein the base station is configured to carry out a method according to the second or third aspect of the present disclosure.

An eighth aspect of the present disclosure provides a communication system including a host computer comprising processing circuitry configured to provide user data; and a communication interface configured to forward user data to a cellular network for transmission to a UE, wherein the UE comprises a radio interface and processing circuitry, the UE's processing circuitry is configured to carry out a method according to the first aspect of the present disclosure.

A ninth aspect of the present disclosure provides a method implemented in a communication system including a host computer, a base station and a UE. The method comprises: at the host computer, providing user data; and at the host computer, initiating a transmission carrying the user data to the UE via a cellular network comprising the base station, wherein the UE is configured to carry out a method according to the first aspect of the present disclosure.

By means of the solutions set forth in the above aspects of the present disclosure and those as discussed hereinafter, more neighboring nodes can be reported of their quality to a serving node of a UE. Thus the serving node would have more appropriate candidate to determine handover. With timely handover, network resource is more reasonably allocated, and the user equipment is better served.

BRIEF DESCRIPTION OF THE DRAWINGS

In the following, the disclosure will be discussed in greater detail by means of exemplary embodiments with reference to the accompanying drawings, in which:

FIGS. 11 and 12 are flowcharts illustrating methods implemented in a communication system including a host computer, a base station and a user equipment.

DETAILED DESCRIPTION

The present disclosure will now be described more fully hereinafter with reference to the accompanying drawings, in which certain embodiments of the present disclosure are shown. This disclosure may, however, be embodied in many different forms and should not be construed as limited to the embodiments set forth herein; rather, these embodiments are provided by way of example so that this disclosure will be thorough and complete, and will fully convey the scope of the present disclosure to those skilled in the art. Like numbers refer to like elements throughout the specification.

Generally, all terms used in the claims are to be interpreted according to their ordinary meaning in the technical field, unless explicitly defined otherwise herein. For example, the user equipment in the present disclosure may be any terminal device capable of receiving information from and/or transmitting information to the network, connectable to the network wirelessly or via a fixed connection. Examples of a network node, such as aforementioned serving node and neighboring node, may refer to any suitable radio access point or access node, for example a radio base station ("BS") according to any suitable communication standard, such as a Node B ("NB") or an evolved NB ("eNB"), for carrying out the solutions as discussed in detail later with reference to the accompanying drawings.

All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The discussion above and below in respect of any of the aspects of the present disclosure is also in applicable parts relevant to any other aspect of the present disclosure.

With the beam grouping information being known by UE, UE measures the quality for each individual beam, while forms its measurement report in a different way. Beams detected by the UE are grouped according to the beam grouping information. Beams within a same group get one measurement result, which could be either the highest or average quality over such group.

In such way, more neighboring node can be reported in the measurement report, thus give the serving node more handover candidates.

In an aspect of the present disclosure, a method implemented by a UE, for measurement, is provided. The method comprises:

detecting, a plurality of beams from one or more of the UE's neighboring nodes;

forming, one measurement result of a group based on beam grouping information;

sending, measurement report to the UE's serving node, wherein the measurement result of the group is included in the measurement report.

Figure 1:
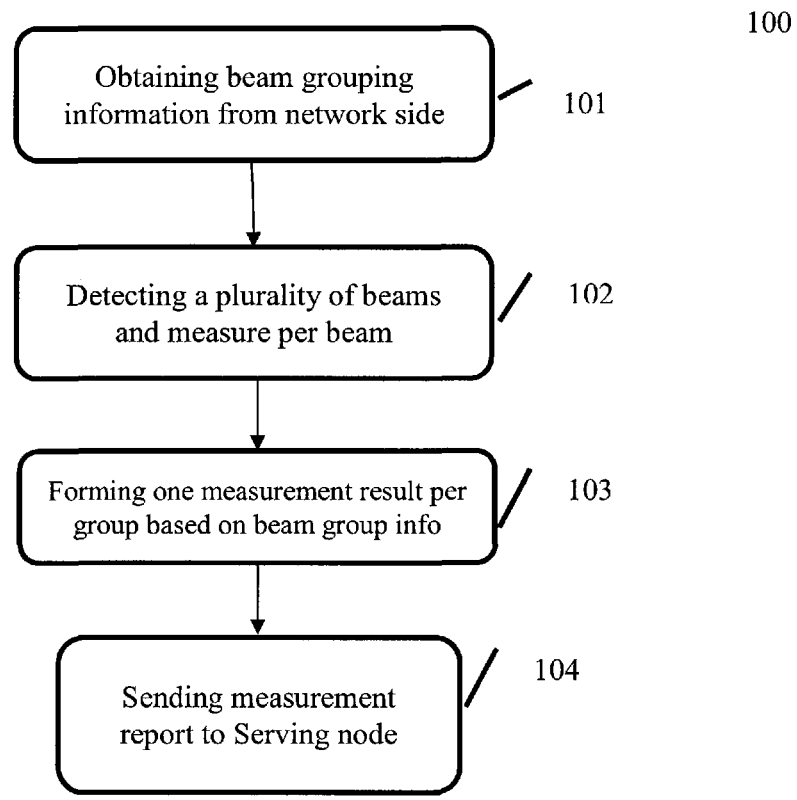
FIG. 1 illustrates a method embodiment implemented by a UE for measurement reporting based on report per group.

FIG. 1 illustrates how a UE form its measurement report in an embodiment of the present disclosure. Method 100 is introduced in detail below.

In step 101, UE obtains beam grouping information from network side such as a wireless network node.

The beam grouping information indicates relationship between a beam identifier and which group the beam belongs to. A group may corresponds to a neighboring node, or a neighboring node is divided into two or more groups.

In step 102, UE has detected a plurality of beams and it measures quality of each individual beam. As for each individual beam that UE has detected, UE knows its beam identifier and the corresponding quality.

UE can obtain beam grouping information before it detects the plurality of beams, for example, just after it connected to the serving node. Or, UE can obtain beam grouping information while it detects the plurality of beams. In below description, UE can obtain the beam grouping information through the beam from the serving node or a neighboring node it detects. Or, after UE detected the plurality of beams and measured them, it can wait till beam grouping information arrives. In other words, Step 101 can happen before or Step 102, or they happen in the meanwhile.

In step 103, UE obtains one measurement result per group based on beam group information.

UE obtaining one measurement result of a group based on beam grouping information includes steps of:

obtaining, a plurality of measurement results corresponding to each of the plurality of beams;

sorting, all measurement results of the beams which belong to the group, wherein the beam grouping information indicates mapping relation between beam and group;

determining, one measurement result of the group, based on all the measurement results of the beams which belong to the group.

With beam grouping information obtained, UE groups its measurement result per beam into one measurement result per group. As a preferred embodiment, the measurement result per group is an average value of those measurements results of the beams within the group.

In step 104, UE send its measurement report to its serving node.

Now let's compare to the example in the background. The maximum reported beam number is changed to maximum reported group number in a measurement report, with the rule of maximum reported result number unchanged as 2. Neighboring node 1 (as group 1) and 2 (as group 2) can be both reported, based on the average beam strength of each neighboring node. More candidate neighboring nodes can be reported its measurement result to the serving node, while in background, when beam 5 and 6 have better quality than beam 3 and 4, only neighboring node 1 will be reported to the serving node.

Inventors found some other problems with the proposal. In the proposal, the reporting of measurement results from UE may be more frequently than needed. For example, if quality of beam 5 is better than that of beam 1 from the serving node, measurement report is triggered to be sent, even the average quality of beam 5 and 6 may be worse than that of beam 1 or that of the average of beam 1 and beam 2 which are both from the serving node. If beams from neighboring node 2 are quite unbalanced on quality, such as beam 5 is much better than beam 6, the service provided by neighboring node 2 is unstable. When the serving node handover the UE to neighboring node 2 according to the reporting of good quality of beam 5, it is possible that shortly after the handover, the current serving node (node 5) handover the UE to one of its neighboring nodes because its signal strength drops sharply, which causes ping-pong effect.

Thus, a further embodiment is introduced to solve the problem. A threshold can be predetermined or dynamically set according to specific circumstance. Only when the quality of a beam group is better than the threshold, the measurement report is sent. The threshold can be same as, or higher/lower than the average quality of the beams from the serving node, depending on actual demand. In such way, the frequency of reporting the measurement report can be reduced.

There are several approaches that UE obtain beam grouping information. Two approaches from an angle of network node informing the beam grouping information to the UE will be explained herein in detail as follow.

Figure 2:
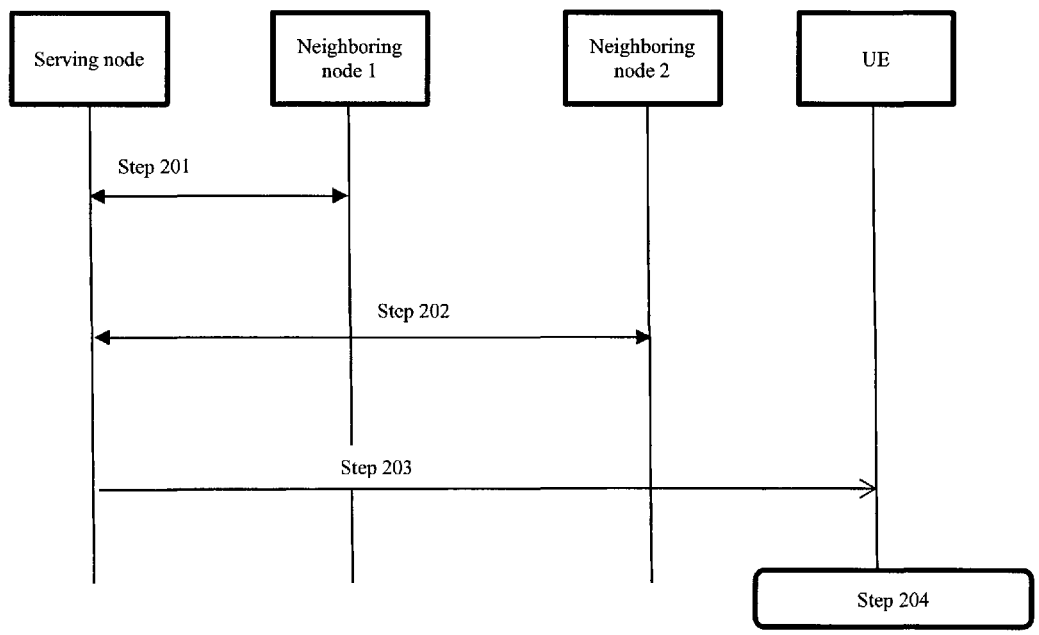
FIG. 2 is a signaling flow diagram exemplarily illustrating a method for a serving node obtaining beam grouping information and providing it to its UE, according to one or more embodiments of the present disclosure.

One of the approaches is the serving node communicating with its neighboring nodes to obtain the group information of the beams from each of the neighboring nodes. FIG. 2 reveals main steps with 2 neighboring nodes as an illustration. In FIG. 2, Serving node negotiates with Neighboring node 1 at step 201, getting to know Neighboring node 1's beam grouping information. The information is ready in the serving node at step 201 and will be conveyed to UE at step 203. During the negotiation, Neighboring node 1 exchanges its beam grouping information with Serving node, thus knows beam grouping information of Serving node. The negotiation would comprise several signaling back and forth, while here we use one step for simplicity. Respectively, Serving node obtains Neighboring node 2's beam grouping information by negotiating with Neighboring node 2 at step 202. Serving node sends beam grouping information of those two neighboring nodes to the UE at step 203. There is no rigid requirement for the sequence of steps 201 and 202. Even, step 203 can be split into two parts informing beam grouping information of neighboring node 1 and 2 after step 201 and 202, respectively.

At step 203, the serving node informs beam grouping information to the UE. It may send the informations through a dedicated signaling, for example, RRC-connection-reconfiguration, to instruct UE's behavior.

In a further embodiment, beam grouping information can be for instance, any of: frequency location range, time occasion range, or beam ID range, etc. Detailed examples are explained below, not limited to the three features as above mentioned.

Take time occasion range as an example. Beam grouping information indicates beams with which subframe(s) or transmission time interval, TTI, belongs to a same group with a group ID. It is assumed that beams 1~6 are detected by the UE, and beam 2 and 3 are within subframe 0, beams 1 and 6 are within subframe 1. UE is told that beams within subframe 0 belongs to neighboring node 1 (group 1, group ID being the node ID). Then UE groups beam 2 and 3 into a same group and form one measurement result based on the measurement results of beam 2 and 3.

Take beam ID range for example. Beam grouping information indicates in what range the beam ID is belongs to a same group. Beam ID here does not necessarily require the actual identity of the beam, while beam index is a good example. Mobility reference signal, MRS, comprise beam identity thus UE can identify a beam through MRS of the beam. Assuming that beam grouping information indicates that beams with index 5~8 will be sorted into a same group which corresponding to neighboring node 2, UE will group detected beam 5 and 6 into a same group.

A deformation of the beam ID range example is to instruct UE to a fixed number of beams into a same group. For example, beams 1~3 belong to group 0, beams 4~6 belong to group 1, beams 7~9 belongs to group 2, etc.

In another example, detected beams at a same physical resource block, PRB, location, or PRB location range, can be indicated by the beam grouping information as a same group. Beams with limited time and frequency range will be sorted by UE into a same group.

From UE's angle, at step 204, UE derive group based on the received beam grouping information, which implicitly indicate mapping relationship between beam and group.

An alternative embodiment varies in step 203. An explicit mapping from Group ID to deterministic beam ID is conveyed to UE. For example, group 1={beam 0, 5, 30}, group 2={beam, 3, 35, 100}. When UE detects beam 5 and 30, its measurement report may include a measurement result of group 1. And then the serving node would know which neighboring node or which cell that group 1 is corresponding to.

With this approach, UE can know which beams belongs to which group, thus from which neighboring node, and then can group them together, at step 204, from UE's perspective, corresponding to step 102~403. Step 201~203 corresponding to step 101 in FIG. 1, while from the angle of the serving node.

As to how UE obtains beam grouping information (step 101 in FIG. 1), another approach is neighboring node providing its beam grouping information, which is mapping information between beams and group via its broadcast message. UE acquires this mapping information by detecting such broadcast message from neighbor node.

From an angle of network node, each node broadcasts the information that which beams are from itself, for example, on its Physical Broadcast Channel, PBCH. From an angle of UE, UE acquires beam grouping information which indicating the mapping relationship between beam ID and its group by detecting PBCH from its neighbor node.

Figures 3, 4:
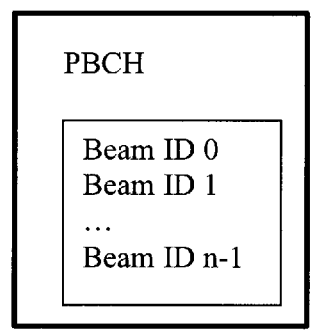
FIG. 3 is an example of beam grouping information broadcasted by a network node according to one or more embodiments.
FIG. 4 is an example of beam grouping information broadcasted by a network node according to one or more embodiments.

An example form of beam grouping information is shown in FIG. 3.

PBCH in FIG. 3 as a Master Information Block, MIB, with its related beam ID (0~n−1) is broadcasted in neighboring node 1's broadcasting channel. Beam ID(s) are transmitted explicitly in each node's PBCH. PBCH is scrambled with a group ID. As explained above, a network node ID may be corresponding to a single group ID, or corresponding to more than one group ID. For example, when a node serves 3 cells, a group ID can be corresponding to a single cell ID. For simplicity, we take one node serving one cell and the group ID being the node ID in this example. Beam 0~n−1 broadcasts a same PBCH as shown in FIG. 3. From UE's perspective as step 101 in FIG. 1, when it receives a PBCH in a beam shown in FIG. 3, if it can decode the PBCH with a corresponding ID, and then get beam IDs of beam 0~ beam n−1 in the PBCH, the UE knows the mapping relationship between beam 0~ beam n−1 and the corresponding node. When it detects beam 0, it knows beam 0 can be grouped into the node with the corresponding node ID.

Another example form of beam grouping information is shown in FIG. 4. In this example, a group ID is a cell ID.

PBCH is scrambled with a cell ID and transmitted over beams. In this example, a node broadcasts multiple PBCHs (i.e., PBCH 1, PBCH 2, PBCH 3, PBCH 4, PBCH 5) respectively over different beams (beam 1~5). In other words, PBCH is transmitted with beam sweeping, such as PBCH 1 being transmitted over beam 1, PBCH 2 being transmitted over beam 2, etc. Each PBCH is scrambled with a group ID (cell ID). PBCH 1, PBCH 2, PBCH 3 use Cell ID 1 for scrambling and PBCH 4 and PBCH 5 use cell ID 2 for scrambling.

When UE acquires a PBCH, based on a scramble ID generated from a cell ID, and resource allocation for the beam over which the PBCH is transmitted, UE can derive the beam association with the group. In this example, UE can associate cell ID 1 with beam 1, beam 2, beam 3 and can associate cell ID 2 with beam 4 and beam 5. The beams with a same cell ID can be assumed as a same group at UE. Thus, the mapping between beam(s) and its group can be acquired.

Figure 5:
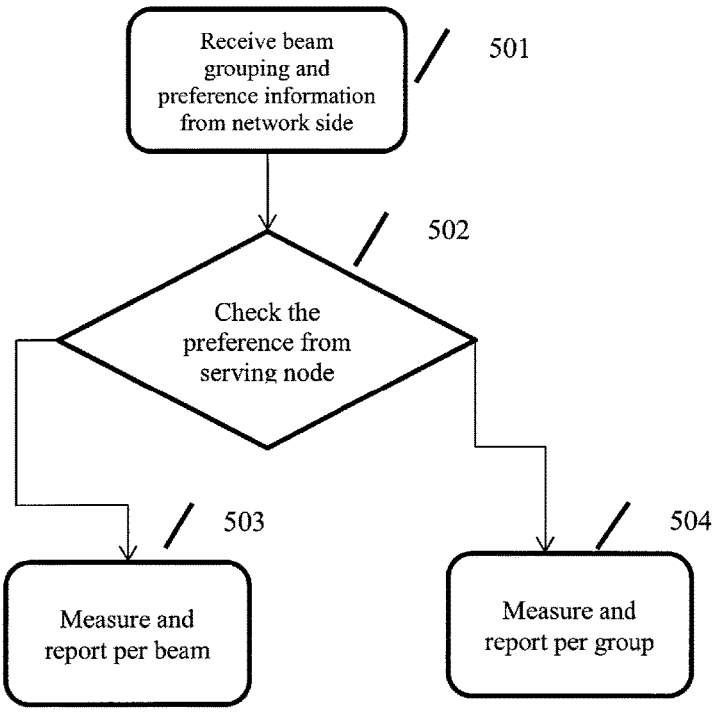
FIG. 5 is a logic flow diagram exemplarily illustrating a method for a UE gets network side's preference of measurement and act accordingly, according to one or more embodiments.
Figure 6:
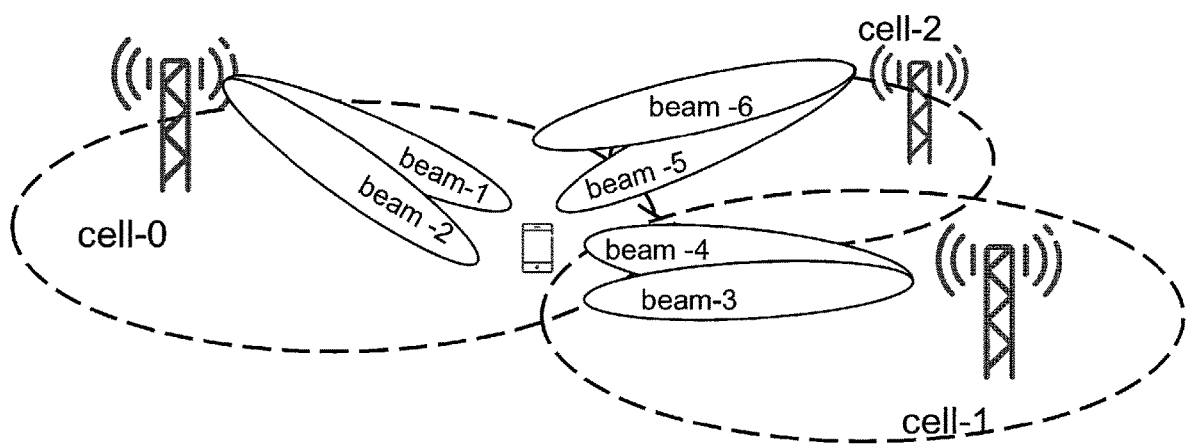
FIG. 6 is a scenario that a UE may detect more than one beam from its serving cell and neighboring cells, which applicable to the background and the disclosed embodiments.

In order to increase flexibility, network node can also inform UE its preference. For example, in circumstance of ideal backhaul, there is tiny cost for handover. Frequent handover is not a scenario trying to be avoided. Network side may want to know individual beam quality, to provide UE-centric service, which means UE is served by a beam with best quality. While sometimes, network node's preference is to know group beam quality. A logic flow diagram FIG. 5 illustrates an embodiment of a solution from an angel of a UE.

At step 501, UE obtain beam grouping information and network preference information from network side.

UE may receive network preference information from its serving node at first. Then it will check the preference at step 502. When the preference indicates to report per group, UE may actively request for beam grouping information, in other words, beam grouping information, from the serving node at step 501. Or the serving node may actively provide the information to the UE at step 501. Or the UE monitor and detect beams from neighboring node to get the broadcast information of beam grouping at step 501. Then at step 504, when UE detects beams from neighboring nodes, it generates its measurement report per group and report it to the serving node.

When the preference indicates to report per beam is step 502, UE detects beams from neighboring nodes, it generates its measurement report per beam and report it to the serving node at step 503. From the above description, it can be found that the steps in FIG. 5 is only for logical understanding. The actual steps and sequence of steps will not be limited to the above description and the sequence of the step numbers (501~504). It can be imagined, the serving node may change its preference during its connection to the UE, and the UE will accordingly adjust the content of its measurement report, switching to or from step 503 and step 504. The flexibility of measurement reporting is increased.

Similarity, user equipment and network node are also provided, according to the aforedescribed method embodiments.

Figure 7:
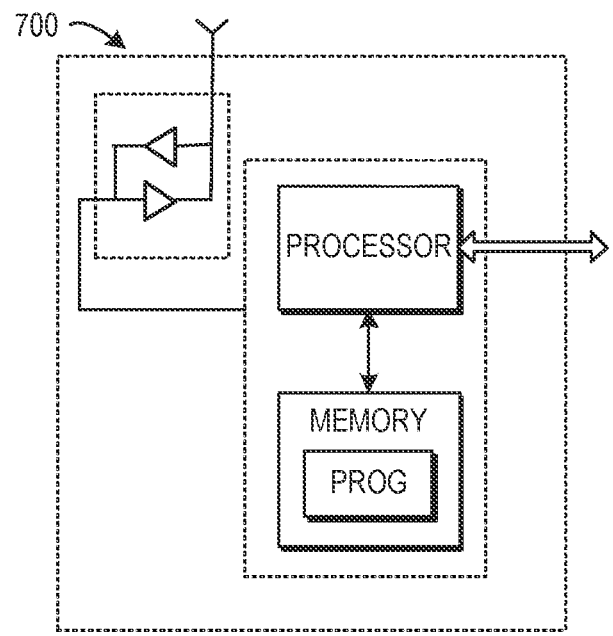
FIG. 7 is a schematic block diagram showing a user equipment and a network node suitable for implementing some exemplary embodiments of the present disclosure detailed herein.

Specifically, FIG. 7 is a simplified block diagram of a user equipment 700 that is suitable for implementing embodiments of the present disclosure. As shown, the device 700 includes a processor, a memory coupled to the processor, a suitable transmitter (TX) and receiver (RX) coupled to the processor, and a communication interface coupled to the TX/RX (only antenna is shown). The memory stores at least a part of a program. The program stores the instructions that is provided in the above embodiments implemented by a UE.

FIG. 7 is also applicable of illustrating a network node that is suitable for implementing embodiments of the present disclosure. The network node could be a serving node of a UE or a neighboring node of the serving node. includes a processor, a memory coupled to the processor, a suitable transmitter (TX) and receiver (RX) coupled to the processor, and a communication interface coupled to the TX/RX (only antenna is shown). The memory stores at least a part of a program. The program stores the instructions that is provided in the above embodiments implemented by the serving node, or the neighboring node, respectively.

Figure 8:
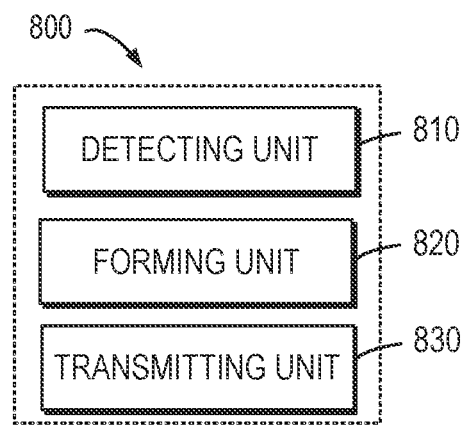
FIG. 8 is schematic block diagram showing a user equipment suitable for implementing some exemplary embodiments of the present disclosure detailed herein.

FIG. 8 is a block diagram of a UE 800 in accordance with some embodiments of the present disclosure. As shown, the UE 800 includes a detecting unit 810 configured to detect a plurality of beams from one or more of the UE's neighboring nodes. The UE 800 also includes a forming unit 820 configured to form one measurement result of a group based on beam grouping information. The UE 800 also includes a sending unit 830, configured to send measurement report to the UE's serving node, wherein the measurement result of the group is included in the measurement report.

Similarly, network nodes such as serving node or neighboring node also can be divided into blocks which implement the steps of the method claims.

Figure 9:
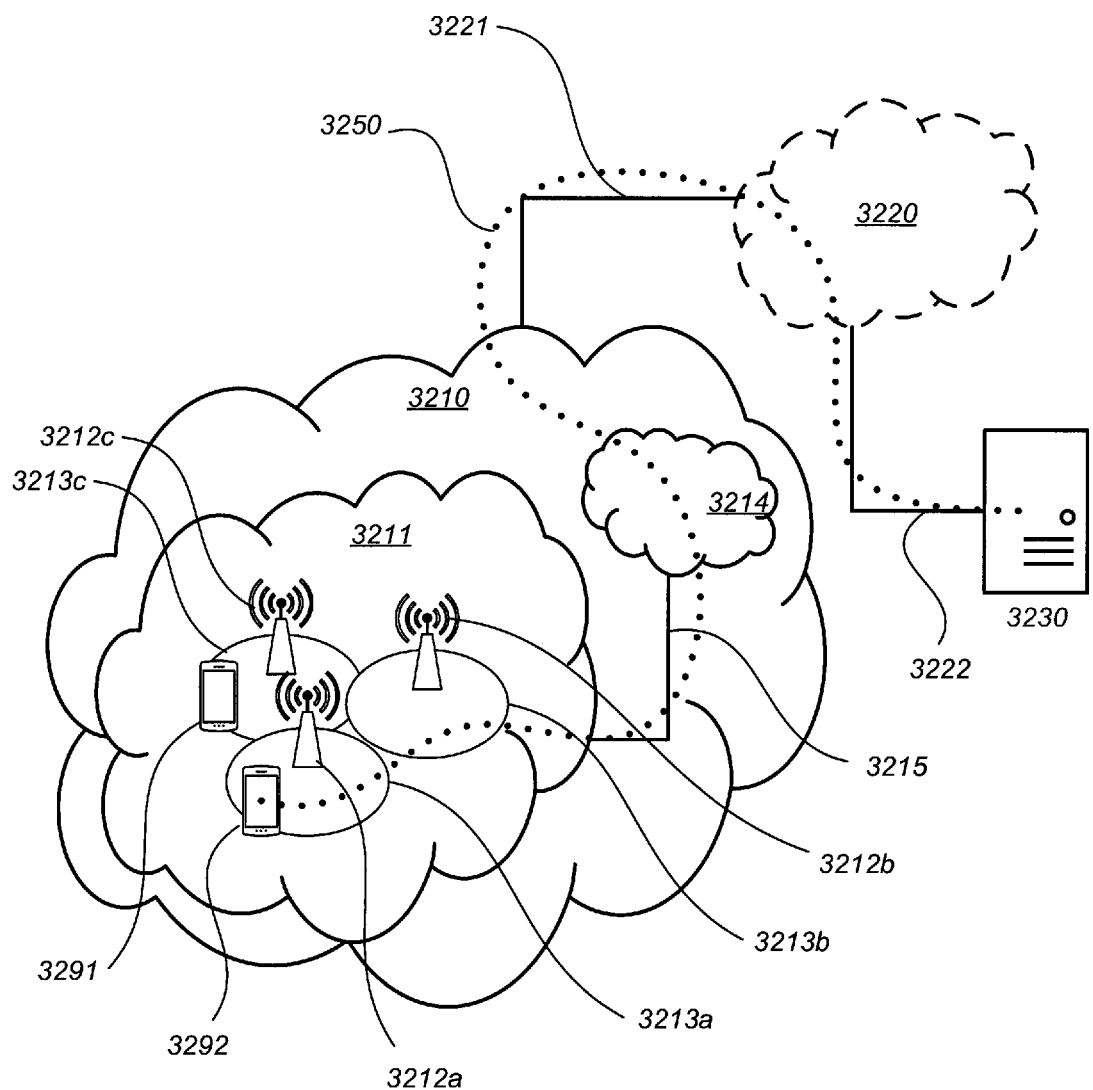
FIG. 9 schematically illustrates a telecommunication network connected via an intermediate network to a host computer.

With reference to FIG. 9, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 9 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown)

adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 10) served by the base station 3320. The communication interface 3326 may be configured to facilitate a connection 3360 to the host computer 3310. The connection 3360 may, be direct or it may pass through a core network (not shown in FIG. 10) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 10:
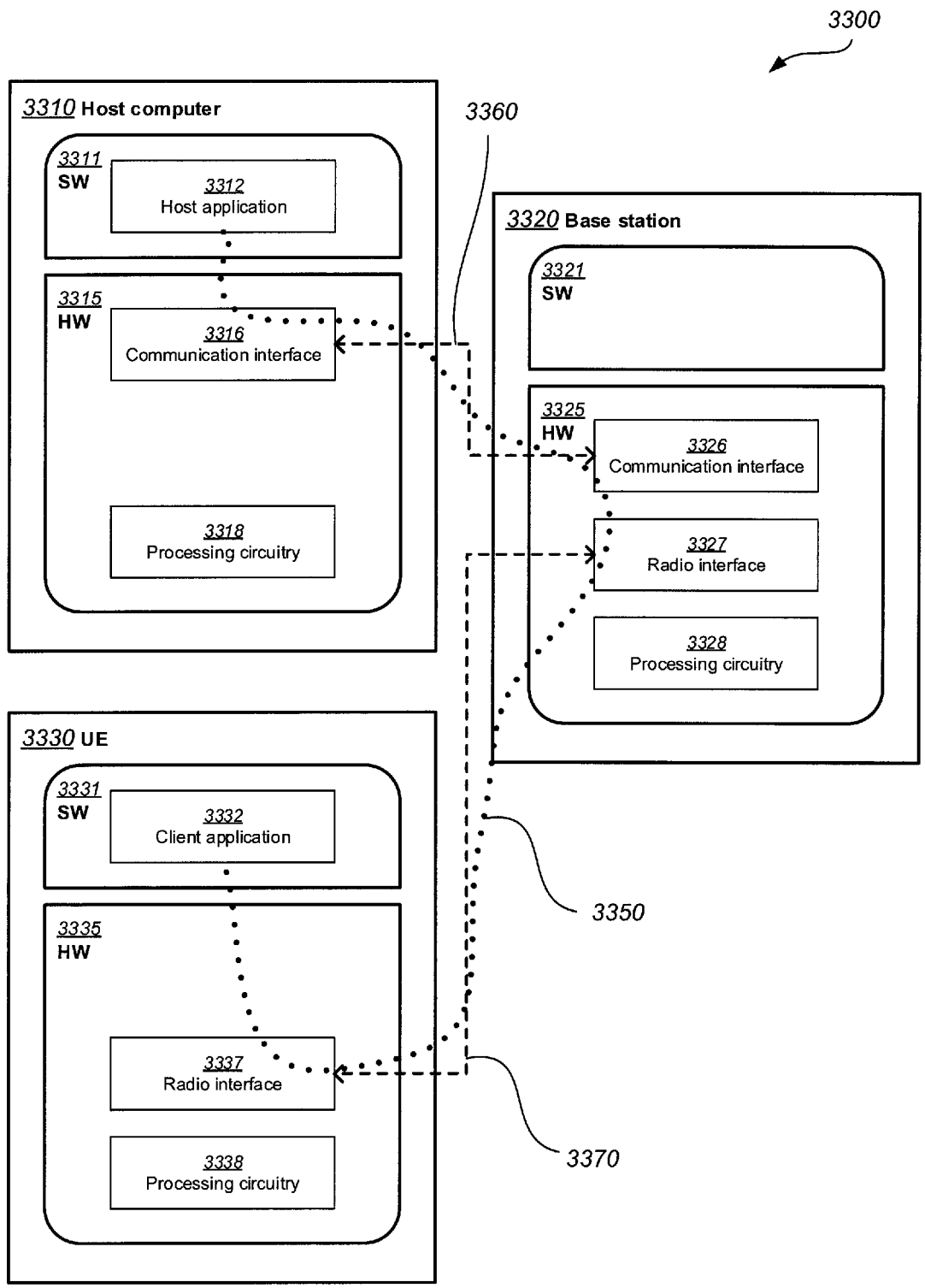
FIG. 10 is a generalized block diagram of a host computer communicating via a base station with a user equipment over a partially wireless connection.

It is noted that the host computer 3310, base station 3320 and UE 3330 illustrated in FIG. 10 may be identical to the host computer 3230, one of the base stations 3212a, 3212b, 3212c and one of the UEs 3291, 3292 of FIG. 9, respectively. This is to say, the inner workings of these entities may be as shown in FIG. 10 and independently, the surrounding network topology may be that of FIG. 9.

In FIG. 10, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the measurement and handover and thereby provide benefits such as better user experience.

Another measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits (for example, through a beam) to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

The foregoing has described various aspects and embodiments of the present disclosure. Many modifications and other embodiments of the disclosures set forth herein will come to mind to one skilled in the art to which these embodiments of the disclosure pertain having the benefit of the teachings presented in the foregoing descriptions and the associated drawings. Therefore, it is to be understood that the embodiments of the disclosure are not to be limited to the specific embodiments disclosed and that modifications and other embodiments are intended to be included within the scope of the appended claims. Although specific terms are employed herein, they are used in a generic and descriptive sense only and not for purposes of limitation.

Although various aspects of the present disclosure are set out in the independent claims, other aspects of the present disclosure comprise other combinations of features from the described embodiments and/or the dependent claims with the features of the independent claims, and not solely the combinations explicitly set out in the claims.

It is also noted herein that while the above describes example embodiments of the present disclosure, these descriptions should not be viewed in a limiting sense. Rather, there are several variations and modifications which may be made without departing from the scope of the present disclosure as defined in the appended claims.

What is claimed is:

1. A method implemented by a user equipment (UE) for measurement reporting, the method comprising:
   detecting a plurality of beams from one or more of the UE's neighboring nodes;
   forming a measurement result of a group based on beam grouping information, wherein the group comprises beams sorted into the group according to at least one range indicated by the beam grouping information, the at least one range comprising any of a frequency location range, a time occasion range, and a beam ID range; and
   sending a measurement report to the UE's serving node, wherein the measurement result of the group is included in the measurement report.

2. The method according to claim 1, wherein the forming a measurement result of a group based on beam grouping information comprises:
   obtaining a plurality of measurement results corresponding to each of the plurality of beams;
   sorting all measurement results of the beams which belong to the group, wherein the beam grouping information indicates a mapping relation between beam and group; and
   determining a measurement result of the group, based on all of the measurement results of the beams which belong to the group.

3. The method according to claim 2, wherein the determining a measurement result of the group comprises:
   obtaining an average value of all measurement results of the beams which belong to the group; or
   obtaining the highest value of all measurement results of the beams which belong to the group.

4. The method according to claim 1, further comprising:
   obtaining the beam grouping information from the serving node, through dedicated signaling; or
   obtaining the beam grouping information from the one or more of the UE's neighboring nodes, on one or more broadcasting channels.

5. The method according to claim 1, wherein the beam grouping information comprises a mapping relation between a group and deterministic beams.

6. The method according to claim 1, wherein the method further comprises, before the forming of a measurement result of the group:
   receiving a preference of measurement report from the serving node; and
   determining, based on the preference, that measurement reporting is per group based.

7. A user equipment (UE) comprising:
   a processor; and
   a memory coupled to the processor and storing instructions thereon, the instructions, when executed by the processor, causing the UE to:
   detect a plurality of beams from one or more of the UE's neighboring nodes;
   form a measurement result of a group based on beam grouping information, wherein the group comprises beams sorted into the group according to at least one range indicated by the beam grouping information, the at least one range comprising any of a frequency location range, a time occasion range, and a beam ID range; and
   send a measurement report to the UE's serving node, wherein the measurement result of the group is included in the measurement report.

8. The user equipment of claim 7, where the user equipment is configured to form the measurement result of the group based on the beam grouping information by:
   obtaining a plurality of measurement results corresponding to each of the plurality of beams;
   sorting all measurement results of the beams which belong to the group, wherein the beam grouping information indicates a mapping relation between beam and group; and
   determining a measurement result of the group, based on all the measurement results of the beams which belong to the group.

9. The user equipment of claim 8, where the user equipment is configured to determine the measurement result of the group based on all the measurement results of the beams which belong to the group by:
   obtaining an average value of all measurement results of the beams which belong to the group; or
   obtaining the highest value of all measurement results of the beams which belong to the group.

10. A network node configured to serve as a serving node of a user equipment (UE), the network node comprising:
  a processor; and
  a memory coupled to the processor and storing instructions thereon, the instructions, when executed by the processor, causing the network node to:
  obtain, from one or more of neighboring nodes, beam grouping information of the one or more of neighboring nodes;
  inform the beam grouping information of the one or more of neighboring nodes to the UE; and
  receive a measurement report from the UE, wherein the measurement report comprises at least one measurement result of a group corresponding to the beam grouping information.

11. The network node of claim 10, wherein the memory further stores instructions which, when executed by the processor, further causes the network node to:
  inform the network node's preference of a measurement report to the UE, wherein the preference instructs that measurement reporting is per group based.

12. A network node configured to serve as a neighboring node of a serving node for a user equipment (UE), the network node comprising:
  a processor; and
  a memory coupled to the processor and storing instructions thereon, the instructions, when executed by the processor, causing the network node to:
  broadcast beam grouping information over a broadcast channel;
  wherein the beam grouping information indicates a mapping relationship between beams from the network node and a group, which enables the UE to recognize a beam belonging to the group.

13. The network node of claim 12, wherein the memory further stores instructions which, when executed by the processor, further causes the network node to notify the relationship of the group with the network node itself.

* * * * *